Aug. 20, 1940.  A. A. SCHWARTZ  2,212,306
COUNTERSINK GAUGE
Filed June 4, 1940
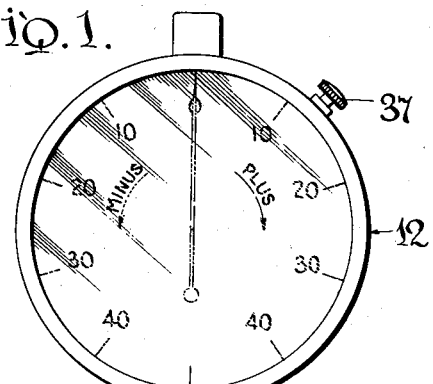
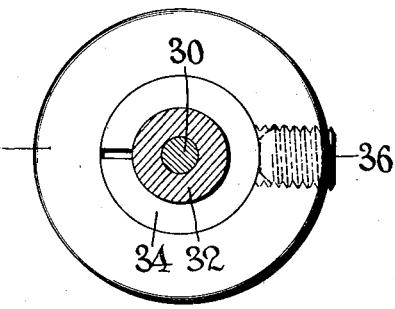
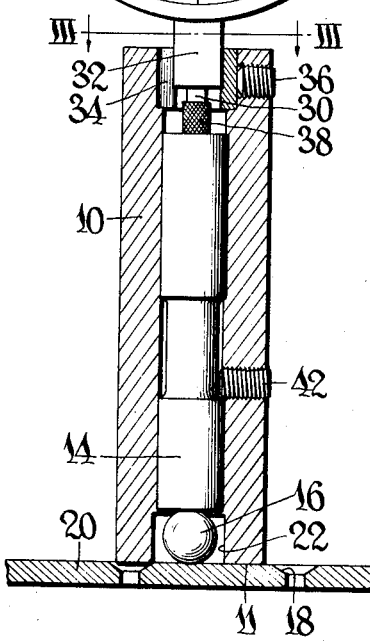
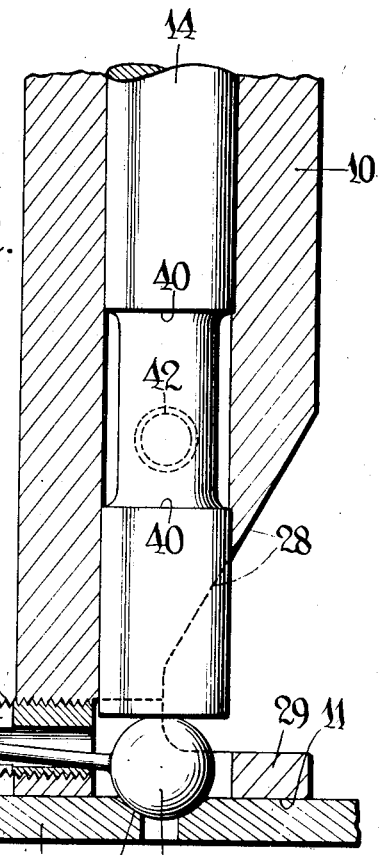
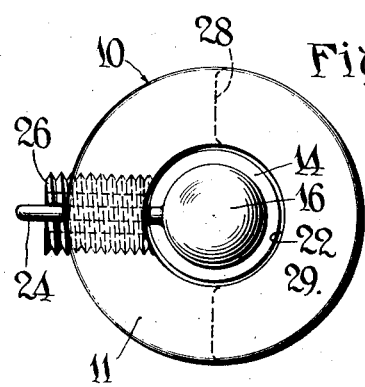
INVENTOR
Arthur A. Schwartz,
BY
Beau, Brooks, Buckley & Beau.
ATTORNEYS Patented Aug. 20, 1940

2,212,306

UNITED STATES PATENT OFFICE 2,212,306

COUNTERSINK GAUGE

Arthur A. Schwartz, Buffalo, N. Y., assignor to Bell Aircraft Corporaton, Buffalo, N. Y.

Application June 4, 1940, Serial No. 338,765

6 Claims. (Cl. 33—172)

This invention relates to countersink depth gauges, and has for one of its objects the provision of an improved gauge of the character described which is adapted to provide more accurate readings in connection with increased speed of use and application to series of countersinks in a common work piece, as in connection with preparation for multiple flush riveting manufacturing operations. Other objects and advantages of the invention will appear in the specification. It is to be understood that as used herein the term countersink is intended to mean any conical shaped opening or recess in a work piece.

In the drawing:

Fig. 1 is a view partly in elevation and partly in vertical section of a gauge of the invention mounted upon a work piece preparatory to movement thereon into gauging relation with respect to countersunk openings therein;

Fig. 2 is a fragmentary vertical section, in a plane substantially at right angles to the plane of the section of Fig. 1, on an enlarged scale, showing a portion of the gauge in operative position relative to a countersunk opening in the work piece;

Fig. 3 is a horizontal section taken substantially along line III—III of Fig. 1; and Fig. 4 is a bottom plan of the gauge.

The gauge comprises generally a tubular body member 10; an indicator 12 mounted at one end of the body member; a plunger 14 which is slidably mounted within the body 10 for actuation of the indicator; and a countersink engaging ball member 16 at the opposite end of the body member for control of the plunger 14. The ball member 16 is of highly polished metal or the like and of perfectly spherical form of such diameter as to be adapted to rest upon the sloping face 18 of a countersunk portion of the work piece 20 as illustrated in Fig. 2. It is preferred that the diameter of the ball 16 be such that the contact between the ball 16 and the sloping surface 18 is intermediate of the upper and lower limits of the surface 18. The diameter of the ball member 16 will therefore be regulated by the form and dimension of the countersink to be gauged, and for this purpose a set of differently sized balls 16 will be provided for use in connection with the gauge.

The body member 10 is generally bored to such diameter as to engage the plunger 14 in accurately fitted but longitudinally slidable relation therein, and is counterbored as at 22 to accommodate the ball member 16 in such manner as to be free for substantial movements therewithin in all directions radially of the vertical axis of the gauge.

The ball member 16 is provided with an integral arm 24 adapted to extend through an opening in a side wall portion of the body member 10 provided by a tubular insert 26 mounted in screw-threaded relation therein. The insert 26 is slotted as at 27 for engagement with a screw driver or similar tool during assembly or disassembly processes. The insert 26 and the arm 24 are so proportioned as to be adapted to prevent the ball 16 from moving totally out of engagement with the body member 10 through the lower open end of the bore thereof whenever the gauge is lifted clear of the work piece. However, the arm 24 and the interior opening through the insert 26 are so relatively proportioned as to allow the ball 16 to have full free movement in all directions within the lower end of the body member short of complete withdrawal therefrom.

When the insert 26 is removed from the body member 10 the opening so provided in the body member side wall is of such size as to free the arm 24 for complete withdrawal of the ball 16 through the lower end of the body member. Thus, the ball 16 may be readily withdrawn from the gauge for purpose of exchanging it with a ball of different diameter; the tubular insert 26 being subsequently refitted in the body member after substitution of the ball members to prevent accidental disassembly of the device.

The plunger 14 is so dimensioned longitudinally as to bear against the upper portion of the ball 16 and to extend therefrom upwardly into abutting engagement with a stem 30 of the actuating mechanism of the indicator 12. The indicator 12 and the actuating mechanism thereof are illustrated in Fig. 1 as being of standard dial indicator form but it will be understood that in lieu thereof any other form may be used, such as a suitable straight-line needle type, as may be preferred. The indicator and actuating mechanism thereof is rigidly mounted upon the gauge body 10 by having its shank portion 32 inset within a split bushing 34 which in turn is rigidly mounted within a counterbored portion of the body 10 by means of a set screw 36. The stem 30 of the indicator actuating mechanism extends beyond the lower end of the shank 22 of the indicator mechanism and is provided with a hardened end portion 38 for bearing against the upper end of the plunger 14. Consequently, the indicator mechanism may be conveniently removed from the device by retraction of the screw 36 which releases the bushing 34 and allows withdrawal of the indicator from the body member 10. The usual dial adjusting screw 37 is provided for manipulation so as to conform the indicating mechanism to exchanges of different sized balls 16 in connection with the measurements of differently diametered countersinks in the work piece.

The plunger 14 is reduced intermediately of its ends to provide a pair of opposed shoulders 40 for co-action with a set screw 42 penetrating an adjacent side wall portion of the body member 10 for limiting downward movement of the plunger within the body 10 upon removal of the gauge from the work piece so as to prevent the operating elements of the gauge from becoming accidentally disassembled. The set screw 42 also functions to stop the upward movement of the plunger within the body member 10 so as to prevent accidental disassembly therefrom whenever the indicator mechanism 12 may be removed.

The body member 10 is notched as at 28 to provide an opening through a side wall portion thereof so that a visual inspection of the ball contacting member 16 may be had at all times during use of the gauge.

To employ the gauge of the invention a ball member 16 of such diameter as to be adapted to reside within the countersink to be measured tangentially to the sloping surface portion 18 thereof is selected and mounted within the gauge. The dial of the indicator mechanism is then adjusted to conform to the selected ball size and to register zero whenever the gauge is set upon a plane surface as illustrated in Fig. 1. The gauge is then held upright in the position shown in Fig. 1 and slid over the surface of the work piece until the ball member 16 drops into one of the countersinks to be measured. The gauge is then shifted radially by the operator in all directions to insure freedom for the ball 16 to move into the full depth of the countersink; the loose fit between the ball 16 and the bore of the body member allowing full centering of the ball in the countersink regardless of the exactitude of the position of the body of the gauge thereover. Consequently, as the operator shifts the gauge radially about the location of the countersink the indicator 12 will reveal the position wherein the ball 16 is lowermost in the countersink, and the reading taken of the indicator under this condition will give the depth of the countersink.

The bottom face portion 11 of the body member 10, as well as the operative contact portions of the plunger 14 and the ball 16 are preferably formed of hardened steel ground and lapped or otherwise reduced to smooth and accurate contoured form so that the measurements taken by the gauge will be precise.

Although only one form of the invention has been shown and described in detail, it will be apparent to those skilled in the art that the invention is not so limited but that various changes may be made therein without departing from the spirit of the invention or the scope of the appended claims.

I claim:

1. A countersink depth gauge comprising essentially a tubular body member adapted to rest at one of its ends against the work piece, a spherical contact member mounted within said body member at the work piece contacting end thereof and freely movable in all directions therewithin, an indicator mechanism mounted upon the other end of said body member and having an indicator actuating element extending into said body member, and a plunger slidably mounted within said body member operatively associated at its opposite ends with said spherical contact member and said indicator actuating member.

2. A countersink depth gauge comprising essentially a body member having a work piece contacting face, a spherical contact member mounted within said body member at said work contacting face thereof and adapted to move from within the compass of said body member into a countersink in said work piece to be measured, said contact member being also freely movable within said body member in all directions in planes parallel to said work piece contacting surface, and countersink depth indicating means mounted upon said body member and operatively associated with said contact member.

3. A countersink depth gauge comprising essentially a tubular body member adapted to rest at one of its ends against the work piece, a spherical contact member mounted within said body member at the work piece contacting end thereof and freely movable in all directions therewithin, an indicator mechanism mounted upon the other end of said body member and having an indicator actuating element extending into said body member, and a plunger slidably mounted within said body member operatively associated at its opposite ends with said spherical contact member and said indicator actuating member, said contact member having a protuberance thereon extending into a recess formed in a side wall portion of said body member.

4. A countersink depth gauge comprising essentially a tubular body member adapted to rest at one of its ends against the work piece, a spherical contact member mounted within said body member at the work piece contacting end thereof and freely movable in all directions therewithin, an indicator mechanism mounted upon the other end of said body member and having an indicator actuating element extending into said body member, and a plunger slidably mounted within said body member operatively associated at its opposite ends with said spherical contact member and said indicator actuating member, said contact member having an integral elongated arm portion extending through an opening through a side wall portion of said body member for preventing total movement of said contact member from within said body member and disassembly of the device.

5. A countersink depth gauge comprising essentially a tubular body member adapted to rest at one of its ends against the work piece, a spherical contact member mounted within said body member at the work piece contacting end thereof and freely movable in all directions therewithin, an indicator mechanism mounted upon the other end of said body member and having an indicator actuating element extending into said body member, and a plunger slidably mounted within said body member operatively associated at its opposite ends with said spherical contact member and said indicator actuating member, said contact member having an integral elongated arm portion extending through a tubular insert mounted in an opening through a side wall portion of said body member for preventing total movement of said contact member from within said body member and accidental disassembly of the device, said tubular insert being adapted to be removed from said body member to provide an opening therethrough of sufficient dimensions to permit total removal of said contact member from said body member, said plunger being recessed intermediately of its ends to accommodate the inner end of a set screw extending through a side wall portion of said body member and providing at its ends stop means adapted to cooperate with said set screw for limiting movements of said plunger within said body member.

6. A countersink depth gauge comprising essentially a tubular body member adapted to rest at one of its ends against the work piece, a spherical contact member mounted within said body member at the work piece contacting end thereof and freely movable in all directions therewithin, an indicator mechanism mounted upon the other end of said body member and having an indicator actuating element extending into said body member, and a plunger slidably mounted within said body member operatively associated at its opposite ends with said spherical contact member and said indicator actuating member, said contact member having an integral elongated arm portion extending through an opening through a side wall portion of said body member for preventing total movement of said contact member from within said body member and disassembly of the device, said body member being provided with a second opening through a side wall portion thereof at a position substantially opposite to that of said first mentioned opening.

ARTHUR A. SCHWARTZ.